(12) United States Patent
Nelson et al.

(10) Patent No.: US 6,548,929 B2
(45) Date of Patent: Apr. 15, 2003

(54) EDDY CURRENT FAN DRIVE

(75) Inventors: Christopher A. Nelson, Bloomington, MN (US); Bradford K. Palmer, Minneapolis, MN (US); James P. LeClaire, St. Paul, MN (US)

(73) Assignee: Horton, Inc., Minneapolis, MN (US)

( * ) Notice: Subject to any disclaimer, the term of this patent is extended or adjusted under 35 U.S.C. 154(b) by 0 days.

(21) Appl. No.: 09/848,244

(22) Filed: May 3, 2001

(65) Prior Publication Data

US 2002/0014804 A1 Feb. 7, 2002

Related U.S. Application Data

(60) Provisional application No. 60/201,411, filed on May 3, 2000.

(51) Int. Cl.[7] .............................................. H02K 49/02
(52) U.S. Cl. ......................... 310/105; 310/92; 292/84.1
(58) Field of Search .................. 310/105, 92; 192/84.1

(56) References Cited

U.S. PATENT DOCUMENTS

| | | | | |
|---|---|---|---|---|
| 3,010,039 A | | 11/1961 | Jaeschke et al. ............ 310/105 |
| 3,458,122 A | * | 7/1969 | Andriussi et al. ........... 310/103 |
| 3,488,535 A | | 1/1970 | Baermann .................... 310/93 |
| 3,601,641 A | | 8/1971 | Baermann .................... 310/93 |
| 3,627,445 A | * | 12/1971 | Andriussi et al. ........... 310/103 |
| 3,826,937 A | * | 7/1974 | Davies ........................ 310/105 |
| 3,872,842 A | | 3/1975 | Medley .................... 123/41.12 |
| 3,924,585 A | * | 12/1975 | Woods ..................... 123/41.12 |
| 4,138,618 A | | 2/1979 | Jaeschke ..................... 310/105 |
| 4,397,380 A | | 8/1983 | Yew .......................... 192/84.51 |
| 4,564,775 A | | 1/1986 | Mazzorana .................. 310/62 |
| 4,926,992 A | | 5/1990 | Linnig ....................... 192/48.2 |
| 5,070,979 A | | 12/1991 | Ohtsuka et al. ............. 192/54.4 |
| 5,331,244 A | | 7/1994 | Rabe .......................... 310/180 |
| 5,490,769 A | * | 2/1996 | Calhoun ........................ 418/1 |
| 5,586,636 A | | 12/1996 | Linnig ....................... 192/48.2 |
| 5,611,416 A | | 3/1997 | Davis et al. ............... 192/58.42 |
| 5,613,586 A | | 3/1997 | Schilling et al. ........... 192/48.3 |
| 5,614,775 A | | 3/1997 | Horski et al. .............. 310/68 R |
| 5,636,719 A | | 6/1997 | Davis et al. ............... 192/18 A |
| 5,650,679 A | * | 7/1997 | Boggs et al. ................ 310/105 |
| 5,687,823 A | * | 11/1997 | Nakagawa et al. .... 192/84.961 |
| 5,819,883 A | | 10/1998 | Organek et al. ........... 188/71.5 |
| 5,821,658 A | * | 10/1998 | Boggs et al. ................ 310/103 |
| 5,823,309 A | | 10/1998 | Gopalswamy et al. ..... 192/21.5 |
| 5,845,752 A | | 12/1998 | Gopalswamy et al. ..... 192/21.5 |
| 5,896,964 A | | 4/1999 | Johnston et al. ........... 192/21.5 |
| 5,898,249 A | | 4/1999 | Boggs, III ................... 310/105 |
| 5,947,248 A | | 9/1999 | Link ........................... 192/84.1 |
| 5,967,273 A | | 10/1999 | Hampton .................... 192/21.5 |
| 5,994,810 A | | 11/1999 | Davis et al. ................. 310/105 |
| 6,109,871 A | | 8/2000 | Nelson et al. .................. 416/36 |
| 6,253,716 B1 | | 7/2001 | Palmer et al. ............. 123/41.12 |
| 6,331,743 B1 | * | 12/2001 | Link ........................... 310/103 |

FOREIGN PATENT DOCUMENTS

| WO | WO 9835169 A1 | * | 8/1998 | ......... F16D/27/112 |
|---|---|---|---|---|

* cited by examiner

*Primary Examiner*—Joseph Waks
(74) *Attorney, Agent, or Firm*—Kinney & Lange P.A.

(57) ABSTRACT

An eddy current fan drive cooling system is operable in a vehicle having a sheave rotating at a speed related to an engine speed. A driving assembly of the cooling system is attached to the sheave. A plurality of poles are exposed around an outer perimeter of the driving assembly. A plurality of windings are wrapped around the poles. The windings are electrically connected to receive a driving signal to generate a magnetic field around the poles. A driven assembly carrying a cooling fan is provided around the driving assembly. The driven assembly includes a plurality of concentric rings arranged around the exposed poles of the driving assembly. An eddy current torque is produced in the rings in response to magnetic flux passing through the rings from the exposed poles due to the magnetic field around the poles.

18 Claims, 4 Drawing Sheets

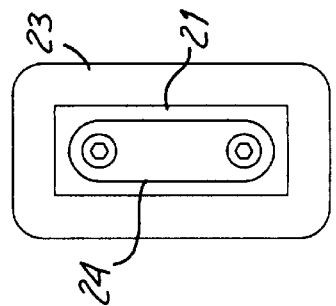
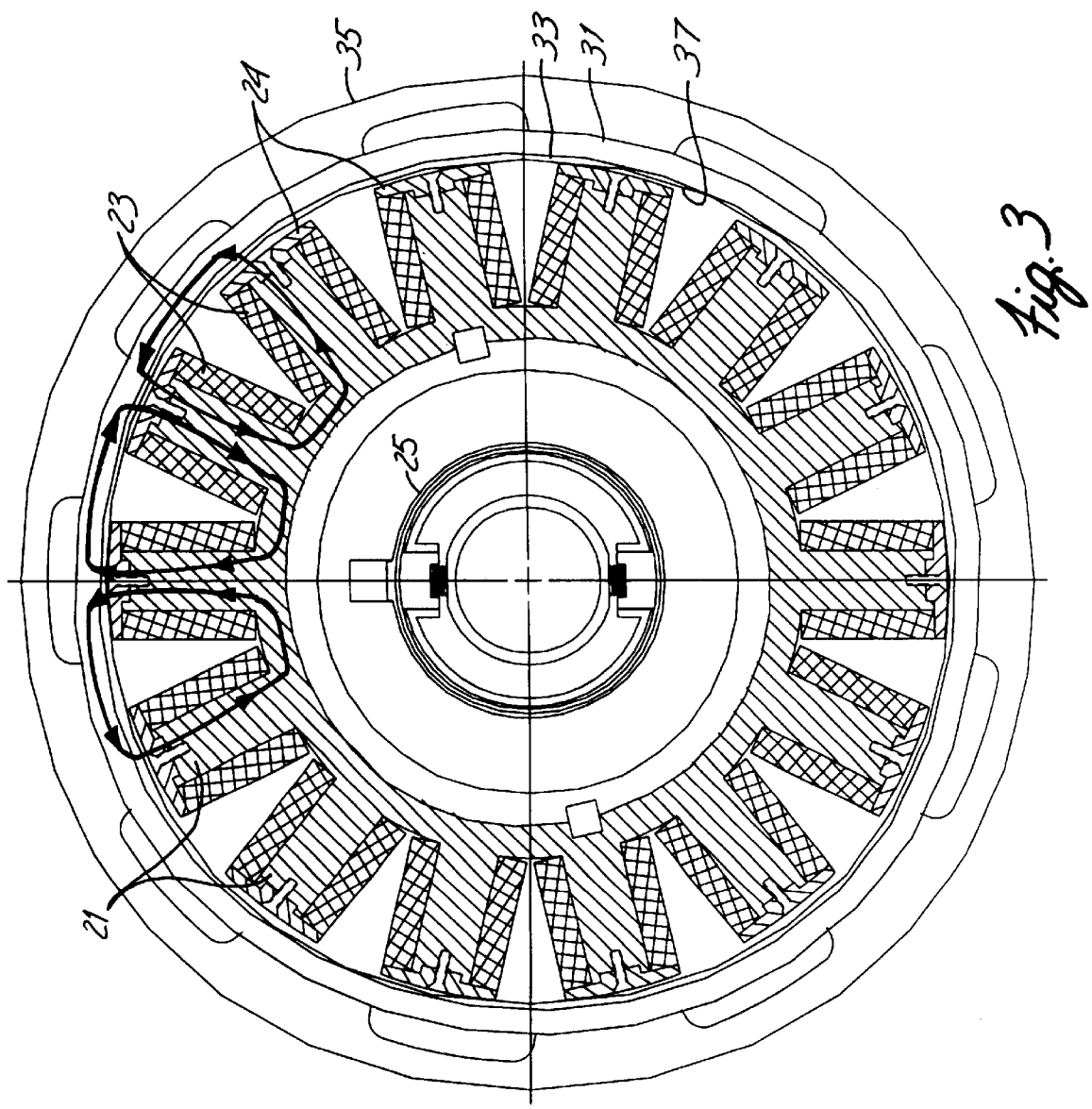

EDDY CURRENT FAN DRIVE

CROSS-REFERENCE TO RELATED APPLICATION(S)

This application claims the benefit of Provisional Application No. 60/201,411 filed May 3, 2000 for "Eddy Current Fan Drive" by C. Nelson, B. Palmer and J. LeClaire.

INCORPORATION BY REFERENCE

The aforementioned Provisional Application No. 60/201,411 is hereby incorporated by reference in its entirety.

BACKGROUND OF THE INVENTION

The present invention relates to a cooling fan, and more particularly to an eddy current fan drive system operable to drive the cooling fan with variable speed control and minimal wear.

Diesel power applications such as over-the-road trucks, off-road equipment and agricultural equipment require a cooling system to serve a variety of cooling needs in the equipment. These systems typically contain a number of heat exchangers, a cooling fan, and in some cases a fan drive. In cases where a fan drive is not used, the fan is driven by a belt and continually rotates at a fixed ratio to engine speed. At least three sub-systems are served by the cooling fan, including the engine cooling system, the charge air system and air conditioning system. Other systems such as a transmission cooling system and hydraulic cooling system could also be served by the cooling fan.

Typical fan drives may be implemented as on/off clutches, viscous clutches or hydraulic systems, for example. On/off clutches are usually mounted to the front of the engine block, and the clutch is belt driven by the crankshaft pulley. In some cases, the on/off clutch is mounted on the water pump, which also turns at a speed related to engine revolutions-per-minute (RPM). On/off clutches may be pneumatic, hydraulic, electric or spring engaging.

Viscous clutches are driven by the same general mechanisms as on/off clutches, except that the clutch is engaged and disengaged by varying the flow path of a viscous fluid through the clutch. Hydraulic clutches may be implemented in several ways, such as by a multiple interface clutch or a self-contained pump and motor assembly. Some hydraulic systems allow the cooling system to be remotely mounted, where belting from the crankshaft is impractical.

A cooling fan is mounted to the fan drive. Typically the fan is an axial flow, circular, plastic injection molded device. Alternatively, the fan could be constructed of a lightweight metal. The fan is located in a fan shroud which is attached to the heat exchanger adjacent to the front of the engine. The fan shroud serves as an adapter which directs the flow from the circular fan through the rectangular heat exchangers. A typical spacing between the fan and the fan shroud is about 0.5 inches to 2.0 inches per side. The large tip clearance is necessary due to the fact that the fan is engine mounted and the shroud is frame mounted, with the potential for displacement between the engine and the frame.

The cooling system can be controlled either by discrete sensors on one or more of the cooling sub-systems to turn the fan on and off, or by electronic controls received from the engine control module (ECM). Many diesel power systems currently employed in the vehicular industry are electronically controlled by an ECM, which is part of an overall communications network used to supply operational information to system components of the vehicle. The ECM may additionally be programmed to engage the fan during exhaust braking, unrelated to a cooling need, in order to draw additional horsepower from the diesel power plant to help stop the vehicle.

In most over-the-road trucks, a spring or air engaged on/off clutch is employed along with a solenoid valve, a cooling fan and a fan shroud. Electronic control is usually utilized so that the fan drive turns on and off based on a signal from the ECM. In addition, a pressure switch in the air conditioning system turns the fan on and off as required. The exhaust brake also is operable to control the operation of the fan as a braking aid.

Typical engine speeds are between 600 RPM (low idle) and 2100 RPM (rated speed). Operating engine speeds are usually between 1200 RPM and 1800 RPM. A typical fan ratio is 1.2:1, thus, operating fan speeds are usually between 1440 RPM and 2160 RPM. At the rated engine speed of 2100 RPM, the fan speed can reach 2520 RPM in such a system. In an exemplary system, the typical horsepower (Hp) for a 32-inch diameter fan ranges between about 13 Hp (at 1140 RPM) and 75 Hp (at 2520 RPM), with fan horsepower increasing cubically with fan speed. The power to drive the cooling fan comes from the engine, reducing the power to the system driven by the engine and consuming fuel.

The fan has two basic operating states. Either the fan clutch is engaged and the fan is on, or the fan clutch is disengaged and the fan is off. Fan engagements can occur in response to parameters associated with a number of sub-systems. The ECM controls engagements of the fan to keep engine coolant within an operating window, typically 182° F.–210° F. for an exemplary vehicle system. The ECM will also turn the fan on in order to keep charge air below a threshold temperature, such as 150° F. in an exemplary system. The A/C system's pressure switch is typically engaged at approximately 240 p.s.i. in an exemplary vehicle system, which will turn the fan on until the pressure falls below the set point. Fan engagements due to exhaust brake application generally occur at higher engine speeds.

The duty cycle of the fan and drive is usually between 5% and 20% on time. The on time can be broken down into a percentage of fan engagements due to sub-system or ECM control (see Table 1), and into a percentage of fan engagements at operating speeds (see Table 2). Both of these are important in analyzing the requirements of the fan, because Table 1 describes which system drives cooling system engagement and Table 2, combined with actual on time, allows calculation of energy expended and clutch life. Table 1 and Table 2 are based on fan engagements observed in an exemplary vehicle engine cooling system, and will vary somewhat for different types of vehicles, engines and cooling systems.

TABLE 1

| Approximate Percentage of Engagements due to ECM/Sub-System Control. | | | | |
| --- | --- | --- | --- | --- |
| System | Coolant | Charge Air | A/C | Exhaust Brake |
| % | 13.8 | — | 45.6 | 40.5 |

TABLE 2

Approximate Percentage of Engagements at Engine Operating Speeds.

| | | | | RPM | | | | |
|---|---|---|---|---|---|---|---|---|
| 700 | 900 | 1100 | 1300 | 1500 | 1700 | 1900 | 2100 | 2300+ |
| % 28.6 | 3.4 | 10.0 | 7.3 | 14.3 | 18.7 | 13.2 | 4.1 | 0.3 |

Generally, engagements above 1800 RPM are in the 40.5% exhaust brake category and engagements below 1200 RPM are in the 45.6% A/C category.

Analyzing the relationships in clutch driven cooling systems between the fan speeds (which are related to engine speeds) and the type of cooling needed reveals that the power diverted to the fan is not well tailored to the power required for the type of cooling requested. One of the more problematic situations is when an engine coolant fan request is made during a low engine RPM, high torque condition. In this situation, the engine is experiencing high heat rejection and requires a high fan speed to achieve the required cooling. However, the low engine RPM during this situation would require a high belt ratio (ratio of fan speed to engine speed) to turn the fan at the necessary speed. Since the belt ratio of the fan is fixed, accommodating this condition with a high belt ratio results in overspeeding of the fan during situations where the engine speed is higher, drawing more power than is needed to achieve proper cooling in that situation. This dilemma has been a necessary shortcoming in clutch driven cooling systems, since it has been impractical to provide infinite variability in the ratio of the speed of the fan to the speed of the engine. It would be a useful improvement in the art to provide a cooling system in which the operation of the fan is directly related to the type of cooling requested, independent of the speed of the engine. Such a cooling system, employing a novel eddy current fan drive, is the subject of the present invention.

BRIEF SUMMARY OF THE INVENTION

The present invention is an eddy current fan drive cooling system for use in a vehicle having a sheave rotating at a speed related to an engine speed. A driving assembly of the cooling system is attached to the sheave. A plurality of poles are exposed around an outer perimeter of the driving assembly. A plurality of windings are wrapped around the poles. The windings are electrically connected to receive a driving signal to generate a magnetic field around the poles. A driven assembly carrying a cooling fan is provided around the driving assembly. The driven assembly includes a plurality of concentric rings arranged around the exposed poles of the driving assembly. An eddy current torque is produced in the rings in response to magnetic flux passing through the rings from the exposed poles due to the magnetic field around the poles.

BRIEF DESCRIPTION OF THE DRAWINGS

The present invention will be further explained with reference to the attached figures, wherein like structure is referred to by like numerals throughout the several views.

FIG. 3 is a front elevational view of the eddy current fan drive shown in FIGS. 1 and 2, with the inner hub and fin pattern of the cooling fan removed for clarity and the poles, windings and caps of the fan drive shown in section for illustrative purposes.

FIG. 4 is a top view of an individual pole, winding and cap of the eddy current fan drive shown in FIG. 1.

While the above-identified drawing figures set forth preferred embodiments of the invention, other embodiments are also contemplated, as noted in the discussion. In all cases, this disclosure presents the present invention by way of representation and no limitation. It should be understood that numerous other modifications and embodiments can be devised by those skilled in the art which fall within the scope and spirit of the principles of this invention.

DETAILED DESCRIPTION

Figure 1:
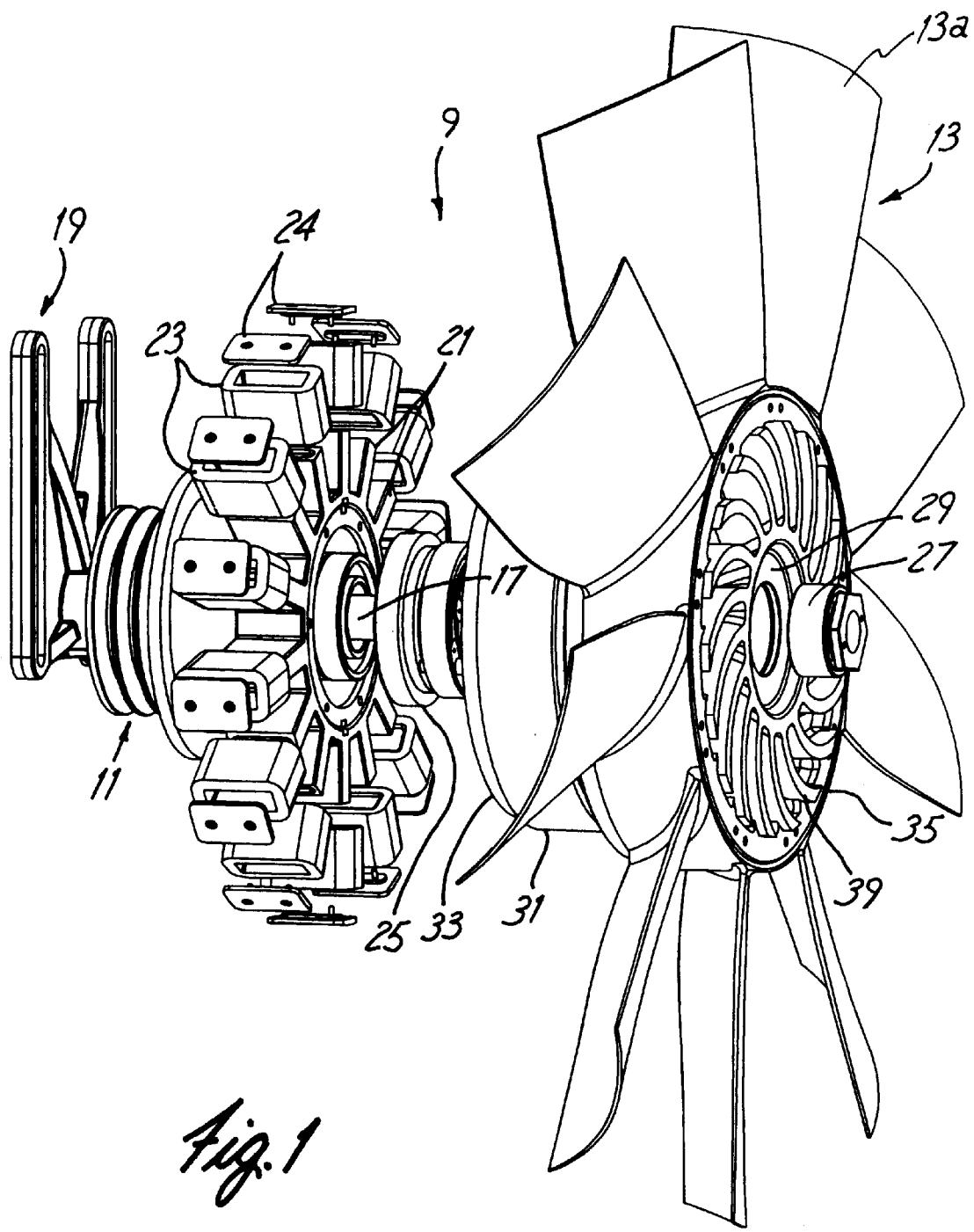
FIG. 1 is an exploded perspective view of an eddy current fan drive for use in a vehicle cooling system according to a first exemplary embodiment of the present invention.
Figure 2:
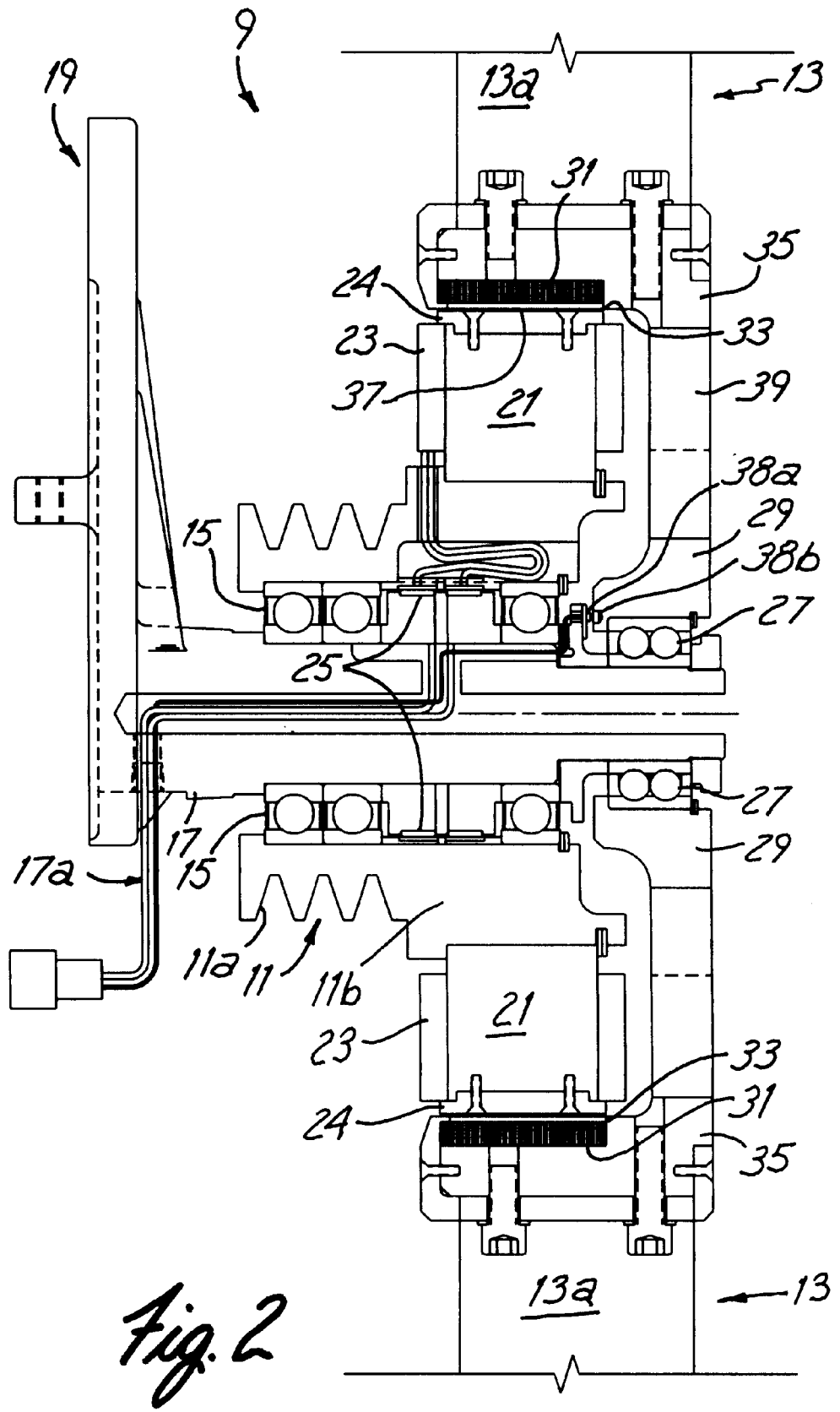
FIG. 2 is a cross-sectional view through the center of the eddy current fan drive shown in FIG. 1.

FIG. 1 is an exploded perspective view of eddy current fan drive 9 for use in a vehicle cooling system according to a first exemplary embodiment of the present invention. FIG. 2 is a cross-sectional view through the center of eddy current fan drive 9, and FIG. 3 is a front elevational view of eddy current fan drive 9, with a fin pattern of the cooling fan removed for clarity and the windings, poles and caps shown in section for purposes of illustration. Eddy current fan drive 9 provides electrical coupling between belted input sheave 11 and cooling fan 13. The crankshaft sheave belt of the vehicle (not shown) drives input sheave 11 as is generally known in the art. Input sheave 11 is mounted by bearings 15 on journal 17, and journal 17 is mounted to the engine of the vehicle via journal bracket 19. Input sheave 11 includes sheave portion 11a and windings portion 11b. Windings portion 11b has an even number of radial poles 21 arranged in a ring. Each of these radial poles 21 is wound by wire to form windings 23, and poles 21 have caps 24 affixed thereon. FIG. 4 is a top view of an individual pole 21, winding 23 and cap 24. Windings 23 alternate in direction, and all of windings 23 are connected. Electrical current is routed via suitable cabling 17a through journal 17 and through slip ring 25 to windings 23. Slip ring 25 is configured and arranged in a manner generally known in the art to electrically couple the current to the rotating driving assembly part that carries windings 23.

Cooling fan 13 has inner hub 29 which is independently mounted via bearings 27 on journal 17 with sheave 11, poles 21, and windings 23. Iron ring 31 and a copper ring 33, nested concentrically, are mounted inside outer hub 35 of fan 13, and a plurality of fan blades 13a extend radially outward from outer hub 35. In order to realize iron ring 31 as an extremely thin layer, iron ring 31 may be a laminated layer of iron or steel in an exemplary embodiment. Inside face 37 of copper ring 33 is exposed. The exposed inside face 37 of copper ring 33 is located around and confronts the radial ends (caps 24) of poles 21 across a narrow gap therebetween.

Magnetic sensor 38a is mounted to the driving assembly of eddy current fan drive 9, such as by a printed circuit board (PCB), and magnet 38b is mounted to the driven assembly supporting cooling fan 13 so as to pass adjacent to magnetic sensor 38a once per revolution of cooling fan 13. Magnetic sensor 38a produces a signal indicating the passing of magnet 38b adjacent to magnetic sensor 38a, the frequency of which indicates the rotational speed of cooling fan 13. It should be understood by those skilled in the art that multiple magnets may be mounted to the driven assembly so that more than one signal is produced for each revolution of cooling fan 13.

In operation, electric current is supplied to the windings 23, producing a magnetic field in each pole 21. The radial outside face of each pole 21, illustrated most clearly in FIG. 3, alternates between "north" and "south". The magnetic field leaves the north pole, passes through copper ring 33, and enters iron ring 31. The field continues through iron ring 31 until it reaches a point adjacent to the south pole where it passes back through copper ring 33 and into the south pole. The direction of the magnetic field is illustratively indicated in FIG. 3 by the lines and arrows shown in the top portion of the figure. Relative rotation between the sheave/pole/winding assembly and the fan/iron/copper assembly causes a "changing flux" in copper ring 33. The changing flux is due to the presence and then the absence of a magnetic field as the sheave/pole/winding assembly rotates around copper ring 33. The changing magnetic flux induces eddy currents, perpendicular to the flux, in copper ring 33. The result of the eddy currents is a tangential force which acts on copper ring 33 and produces a torque on the fan/iron/copper assembly.

By realizing iron ring 31 as a very thin laminated layer of iron or steel in an exemplary embodiment, the eddy currents induced in iron ring 31 can be minimized. This is desirable because of the heat that can potentially be generated by eddy currents in iron ring 31, which may require an elaborate strategy or design to dissipate that heat. Minimizing the thickness of iron ring 31 and thus the eddy currents in iron ring 31 reduces the heat generated thereby, and simplifies the implementation of the heat dissipation strategy or design required in the eddy current fan drive of the present invention.

The eddy current drive produces torque proportional to the current in windings 23. Therefore, in order to control the torque and consequently the output speed of the drive, it is necessary to control the current through windings 23. This is done by pulse width modulating the voltage applied to windings 23. With pulse width modulation the average DC voltage supplied to windings 23 is proportional to the pulse width of the applied voltage. Since the current through windings 23 is proportional to the voltage applied to them, the current flow can be controlled by pulse width modulating the voltage supply. The rotational speed of the eddy current drive can be infinitely varied between zero and a maximum by varying the duty cycle of the pulse width modulated signal applied to windings 23. Parasitic losses in "fan off" conditions are eliminated with zero voltage, zero current, and zero fan speed, and also due to the independent bearing mounts of the driving assembly and the driven assembly of the system.

A control system for the eddy current fan drive functions in a closed loop feedback mode. Appropriate controls are provided to vary the current in windings 23 and thereby control the eddy currents induced in copper ring 33 (and thus the torque/speed of fan 13). A number of configurations for implementing these controls will be apparent to those skilled in the art. In operation, the desired fan speed is received by the controls from the engine control module (ECM) of the vehicle. This desired speed value can be sent to the controls in a number of different ways. It can be supplied as a pulse width modulated signal from the ECM, where the pulse width of the signal from the ECM is proportional to the desired fan speed. Alternatively, the desired fan speed can be received from the ECM in the form of a digital message sent over the vehicle serial communication network. The desired fan speed may be determined in a manner similar to that disclosed in U.S. Application No. 09/848,544 filed on even date herewith for "Brushless DC Ring Motor Cooling System" by C. Nelson and B. Palmer, which is hereby incorporated by reference. Once the desired fan speed message is received, the fan control compares the actual measured fan speed (determined by operation of magnetic sensor 38a and magnet 38b in an exemplary embodiment) to the desired speed and adjusts the pulse width of the voltage applied to windings 23 to compensate. For example, if the fan is going slower than desired, the controls will determine this error and increase the pulse width of the voltage supply in order to increase the fan speed to the desired level.

Eddy current fan drive 9 of the present invention is designed to achieve substantial heat dissipation. Windings 23 will heat up when current is supplied, and heat will be generated in iron ring 31 and copper ring 33 due to the changing magnetic field in those rings. The design of eddy current fan drive 9 dissipates this heat. Poles 21 and windings 23 are separated to allow airflow between them, as shown in FIG. 3. Iron ring 31 and copper ring 33 are integral to outer hub 35 of fan 13, which is designed to withstand the increased temperature. A radial fin or airfoil pattern 39 is provided in the center section of fan 13 (between inner hub 29 and outer hub 35), in line with the opening between windings 23, as shown in FIG. 1. Fin pattern 39 provides cooling airflow through windings 23 and poles 21 when fan 13 is turning and windings 23 are active. Windings 23 and poles 21 are attached to sheave 11 which is always turning when the engine is running. The constant rotation, independent of eddy current coupling operation, will continuously provide cooling airflow around windings 23. In addition, the "belt ratio" (ratio of fan speed to engine speed) of eddy current fan drive 9 can be set higher than current clutch driven systems. A higher ratio will allow higher fan speeds at lower engine speeds to provide more cooling. At higher engine speeds, speeds which would cause excessive fan RPM, the eddy current fan drive can "slip" the output relative to the input (rotate the fan slower than the engine) and keep the fan RPM within a safe operating range.

Figure 5:
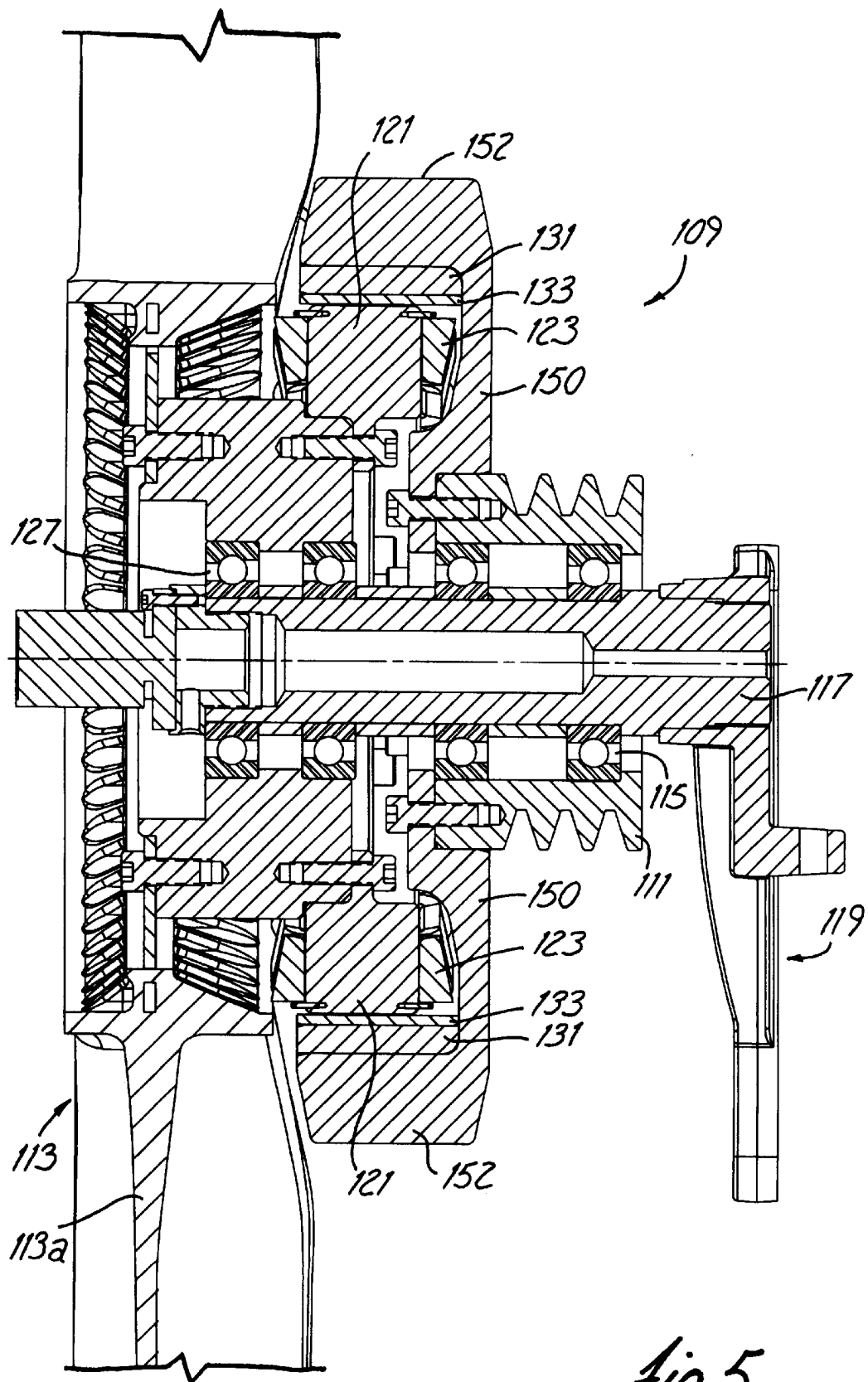
FIG. 5 is a cross-sectional view through the center of an eddy current fan drive cooling system according to a second exemplary embodiment of the present invention.

FIG. 5 is a cross-sectional view through the center of eddy current fan drive system 109 according to a second exemplary embodiment of the invention. Eddy current fan drive system 109 operates on the same principle described above with respect to the first exemplary embodiment (eddy current fan drive system 9), except that the relationship of several components are reversed. For clarity of illustration, comparable components of the second exemplary embodiment shown in FIG. 5 are indicated by the same reference numeral used in FIGS. 1–4, indexed upward by 100. In the second exemplary embodiment, iron ring 131 and copper ring 133 are affixed to sheave 111, while poles 121 and windings 123 are affixed to cooling fan 113. Support ring 150 is affixed to sheave 111 to rotate therewith about bearings 115, and carries iron ring 131 and copper ring 133 on its inner face. A plurality of cooling fins 152 project radially outward from support ring 150 to dissipate heat therein. Poles 121 and windings 123 are affixed to fan 113 to rotate therewith about bearings 127 relative to iron ring 131 and copper ring 133. The general operation of eddy current fan drive 109 shown in FIG. 5 is substantially identical to that of the first exemplary embodiment shown in FIGS. 1–4.

The eddy current fan drive system of the present invention provides infinitely variable speed control of the cooling fan, depending on the cooling requirement of the engine rather than the rotational speed of the engine. The rotation of the engine crankshaft is used to generate the eddy currents for driving the cooling fan, but there is no frictionally engaging clutch having its associated wear concerns. The eddy current drive has no mechanical interface between its parts, but only an electrical coupling that generates the eddy currents needed to rotate the fan. This system has no parasitic losses when the fan is off, since no current is supplied for that condition, and since the driving assembly of the system and the driven assembly of the system are independently bearing mounted on the supporting journal. The eddy current fan drive system of the present invention therefore is capable of experiencing long product life with low maintenance, since there are no moving parts, no wear parts, no seals, no sliding interfaces, no frictional interfaces, and no sharp mechanical engagements. The majority of bearing loads are radial in nature, which also allows long bearing life.

Although the present invention has been described with reference to preferred embodiments, workers skilled in the art will recognize that changes may be made in form and detail without departing from the spirit and scope of the invention.

What is claimed is:

1. A cooling system for use in a vehicle having a sheave rotating at a speed related to an engine speed, the cooling system comprising:
   a driving assembly attached to the sheave, the driving assembly including a plurality of poles exposed around an outer perimeter of the driving assembly and a plurality of windings around the poles, the windings being electrically connected to receive a driving signal to generate a magnetic field around the poles; and
   a driven assembly carrying a cooling fan, the driven assembly including a plurality of concentric rings arranged around the exposed poles of the driving assembly so as to produce an eddy current torque in the rings in response to magnetic flux passing through the rings from the exposed poles due to the magnetic field around the poles.

2. The cooling system of claim 1, wherein the driving assembly and the driven assembly are independently bearing mounted on a common support journal.

3. The cooling system of claim 1, wherein the plurality of concentric rings or the driven assembly comprises:
   an iron ring confronting the plurality of poles exposed around the outer perimeter of the driving assembly; and
   a copper ring around the iron ring.

4. The cooling system of claim 1, wherein the plurality of poles are arranged with polarities of adjacent poles alternating between north and south.

5. The cooling system of claim 1, wherein the driving signal comprises a pulse width modulated voltage signal for generating a current in the windings, the current having an amplitude that is related to an amplitude and a duty cycle of the pulse width modulated voltage signal.

6. The cooling system of claim 5, wherein a speed of rotation of the driven assembly is related to the speed of rotation of the sheave and the amplitude of the current in the windings.

7. The cooling system of claim 5, wherein the duty cycle and amplitude of the pulse width modulated voltage signal is controlled based on a pulse width modulated control signal from an engine control module (ECM) of the vehicle.

8. The cooling system of claim 5, wherein the duty cycle and amplitude of the pulse width modulated voltage signal is controlled based on a digital signal from a serial communications network of the vehicle.

9. The cooling system of claim 1, wherein the driven assembly includes an airfoil pattern to facilitate cooling of the driven assembly.

10. A cooling system for use in a vehicle having a sheave rotating at a speed related to an engine speed, the cooling system comprising:
    a driving assembly attached to the sheave, the driving assembly including a plurality of concentric rings on an inner diameter of the driving assembly; and
    a driven assembly carrying a cooling fan, the driven assembly including a plurality of poles exposed around an outer perimeter of the driven assembly and a plurality of windings around the poles, the windings being electrically connected to receive a driving signal to generate a magnetic field around the poles, whereby an eddy current torque is produced in the poles and the windings in response to magnetic flux passing through the rings and the exposed poles due to the magnetic field around the poles.

11. The cooling system of claim 10, wherein the driving assembly and the driven assembly are independently bearing mounted on a common support journal.

12. The cooling system of claim 10, wherein the plurality of concentric rings or the driving assembly comprises:
    an iron ring confronting the plurality of poles exposed around the outer perimeter of the driven assembly; and
    a copper ring around the iron ring.

13. The cooling system of claim 10, wherein the plurality of poles are arranged with polarities of adjacent poles alternating between north and south.

14. The cooling system of claim 10, wherein the driving signal comprises a pulse width modulated voltage signal for generating a current in the windings, the current having an amplitude that is related to an amplitude and a duty cycle of the pulse width modulated voltage signal.

15. The cooling system of claim 14, wherein a speed of rotation of the driven assembly is related to the speed of rotation of the sheave and the amplitude of the current in the windings.

16. The cooling system of claim 14, wherein the duty cycle and amplitude of the pulse width modulated voltage signal is controlled based on a pulse width modulated control signal from an engine control module (ECM) of the vehicle.

17. The cooling system of claim 14, wherein the duty cycle and amplitude of the pulse width modulated voltage signal is controlled based on a digital signal from a serial communications network of the vehicle.

18. The cooling system of claim 10, wherein the driven assembly includes an airfoil pattern to facilitate cooling of the driven assembly.

* * * * *